United States Patent [19]

Perry

[11] 4,354,793
[45] Oct. 19, 1982

[54] REEL LOCKING MECHANISM FOR A REEL LOADER APPARATUS

[75] Inventor: Marvin D. Perry, West Des Moines, Iowa

[73] Assignee: Mid-America Body & Equipment Co., West Des Moines, Iowa

[21] Appl. No.: 232,257

[22] Filed: Feb. 6, 1981

[51] Int. Cl.³ .............................................. B60P 1/00
[52] U.S. Cl. .................................. 414/546; 414/911; 294/90
[58] Field of Search ...................... 414/546, 408, 911; 294/88, 104, 83 R, 90

[56] References Cited

U.S. PATENT DOCUMENTS

| | | | |
|---|---|---|---|
| 3,184,082 | 5/1965 | Hall | 414/546 |
| 3,625,380 | 12/1971 | Anderson | 414/546 |
| 3,820,673 | 6/1974 | McVaugh | 414/546 |
| 3,902,612 | 9/1975 | Hall | 414/546 X |
| 3,937,515 | 2/1976 | Langowski | 294/90 |
| 3,938,671 | 2/1976 | Lewey et al. | 414/911 X |
| 4,091,946 | 5/1978 | Kraeft et al. | 414/911 X |

Primary Examiner—John J. Love
Assistant Examiner—L. E. Williams
Attorney, Agent, or Firm—Rudolph L. Lowell

[57] ABSTRACT

The locking mechanism holds a reel spindle against rotational and axial movements at all times during the loading and transport of a cable reel. Each pivoted lift arm of the reel handling apparatus is of a tubular construction and formed at its free end with a spindle receiving pocket within which the reel spindle is locked against movement by being clamped into frictional engagement with portions of the pocket. The locking member is movably supported within each lift arm and has a jaw portion retractable within an arm to open the pocket. A power unit for actuating the locking member is enclosed within an associated lift arm.

2 Claims, 6 Drawing Figures

REEL LOCKING MECHANISM FOR A REEL LOADER APPARATUS

BACKGROUND OF THE INVENTION

In cable reel handling apparatus, the reels, in the loading and transporting thereof, are generally provided with rods or spindles loosely extended axially therethrough. The reel lifting arms generally have spindle receiving pockets at their free ends which, when a spindle is supported therein, are closed by pins manually inserted in an arm at positions to close the pockets. The spindles are thus free to rotate and move axially within a pocket when a reel is being unwound or is in transport. These reel rotational and vibrational movements frequently effect spindle movement out of a supported position on a lift arm with resultant injury to or inconvenience to an attendant workman.

The pin locking of a reel spindle is disclosed in U.S. Pat. Nos. 3,036,790; 3,184,082; 3,625,380 and 3,902,612. In U.S. Pat. No. 2,867,390 a reel spindle is loosely locked in a bearing support of a split collar construction. However, the spindle is free to rotate and move axially within the collar support.

SUMMARY OF THE INVENTION

In order to overcome the deficiencies of the prior art reel locking devices, the present invention provides a power operated remotely controlled locking mechanism for rigidly clamping the spindle of a reel in a receiving pocket of a lift arm against rotational and axial movements. A reel lift arm is of a tubular construction and constitutes an enclosing housing for a locking member and associated power actuating unit so that a lift arm is without any exterior appendages or projections. The locking member has a jaw retractable into the lift arm to open the pocket for spindle reception and extendible into clamped engagement with the pocket received spindle. The base wall of the pocket has a dimension slightly smaller than the diameter of the spindle, so that the spindle, when in clamped engagement with the jaw member, is forced into frictional engagement with the pocket base wall against any rotation or axial movements.

DESCRIPTION OF THE INVENTION

Figure 1:
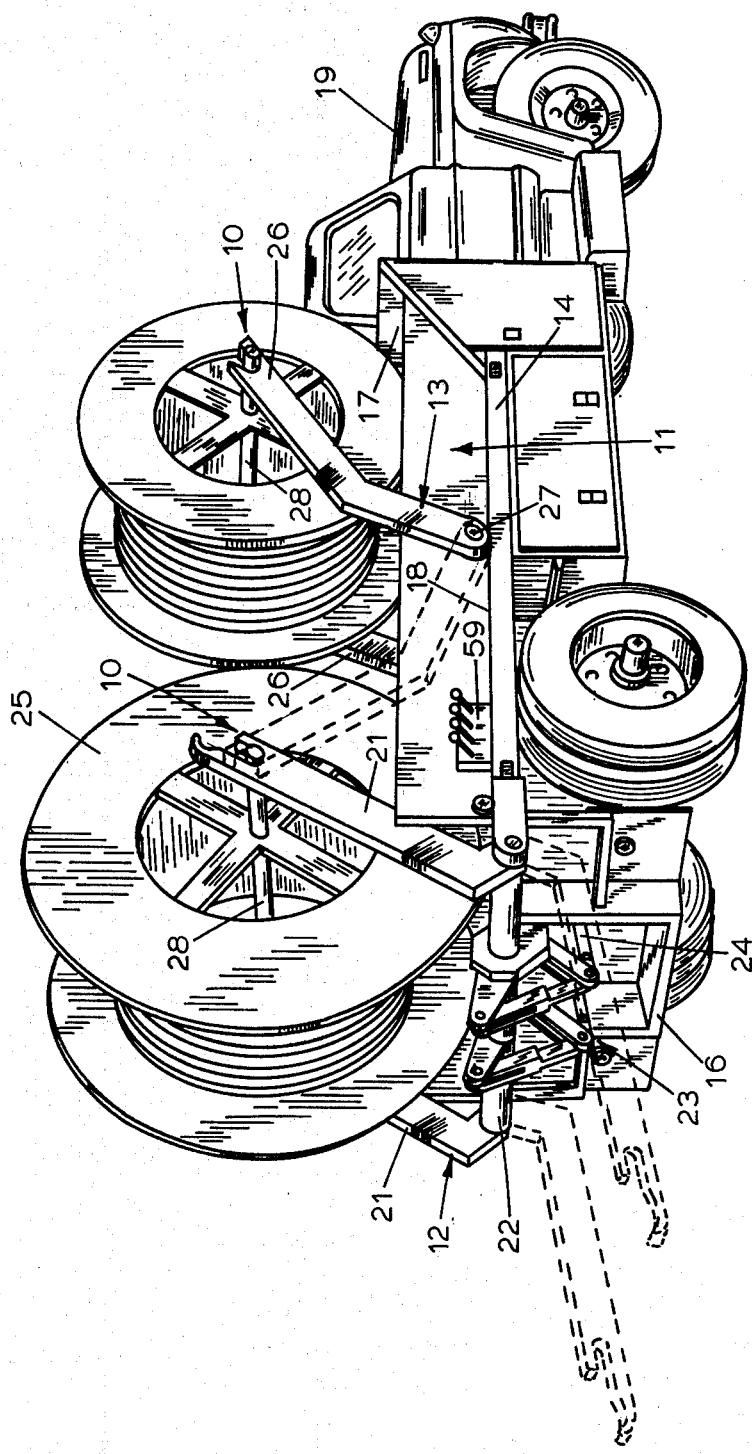
FIG. 1 is a perspective view of a reel handling apparatus which embodies the reel spindle locking mechanism of this invention.

The reel locking mechanism of this invention, indicated generally in the drawings at 10, is shown in assembly relation with a reel loading apparatus that incorporates in a unit assembly a body structure 11 (FIG. 1) that has a rear reel loading mechanism 12 and a front reel supporting mechanism 13 (FIG. 1). The body structure 11, which includes longitudinally extended side frame members 14, a rear transverse frame member 16, a front upright wall 17 and a deck or bottom wall 18, is adapted for mounting on the main frame or chassis of a vehicle such as a truck 19. The body structure 11 thus constitutes a portable reel carrying frame assembly.

The rear reel loading mechanism 12 includes a pair of rear lift arms 21 of a tubular construction that are carried on a transverse rock shaft 22 for movement to a reel loading position projected downwardly and rearwardly, as shown in dotted lines in FIG. 1, to an upwardly and forwardly extended reel transfer and transport position, shown in full lines. The rock shaft 22 is hydraulically actuated through linkage systems 23 by a pair of hydraulic cylinder assemblies 24 which extend longitudinally of and below the deck or platform 18. For a more detailed description of the rear reel loading mechanism 12 and body structure 11, reference is made to U.S. Pat. No. 3,625,380.

As further shown in FIG. 1, the front reel supporting mechanism 13 includes a pair of front tubular lift arms 26 spaced transversely of the body structure 11 and mounted on a rock shaft 27 for movement from a loading or transfer position, shown in dotted lines in FIG. 1, to an upwardly and forwardly projected transport or storage position, shown in full lines. The front lift arms 26 are actuated by a pair of hydraulic cylinders (not shown) operatively associated with a rock shaft 27.

In the use of the reel loading apparatus, the spindle of a ground supported reel (not shown) is received on the rear lift arms 21, when in their loading positions, by manipulation of the vehicle 19. The loaded reel is then moved upwardly and forwardly to the position shown for a reel 25 in FIG. 1. In this position, the reel may be transported on the vehicle 19 or transferred to the front lift arms 26, when the arms 26 are in their reel transfer positions shown in dotted lines in FIG. 1. On transfer of the reel 25 from the rear lift arms to the front lift arms for transport on such arms, the rear lift arms 21 are made available for the loading and transport of a second reel.

In the handling or transport of a reel, it is desirable that a reel spindle 28, which is loosely extended axially through a reel, be rigidly carried in the lift arms to avoid their displacement by accident, by rotational movement of a reel during a cable unwinding process or by jarring movement effected by travel of the vehicle 19 during reel transport. For this purpose, each lift arm 21 and 26 is equipped with a reel locking mechanism 10.

Figure 2:
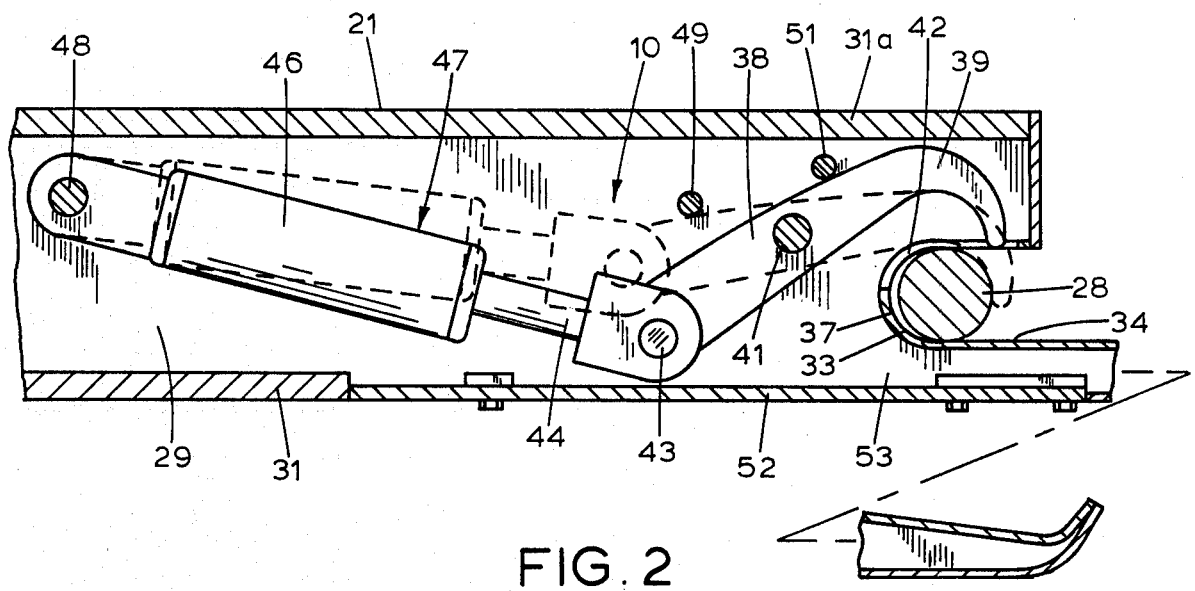
FIG. 2 is an enlarged detail sectional view of the free end portion of a rear lift arm, illustrated in FIG. 1, showing the reel spindle locking mechanism in side elevation with the locking member thereof in a retracted position.
Figure 3:
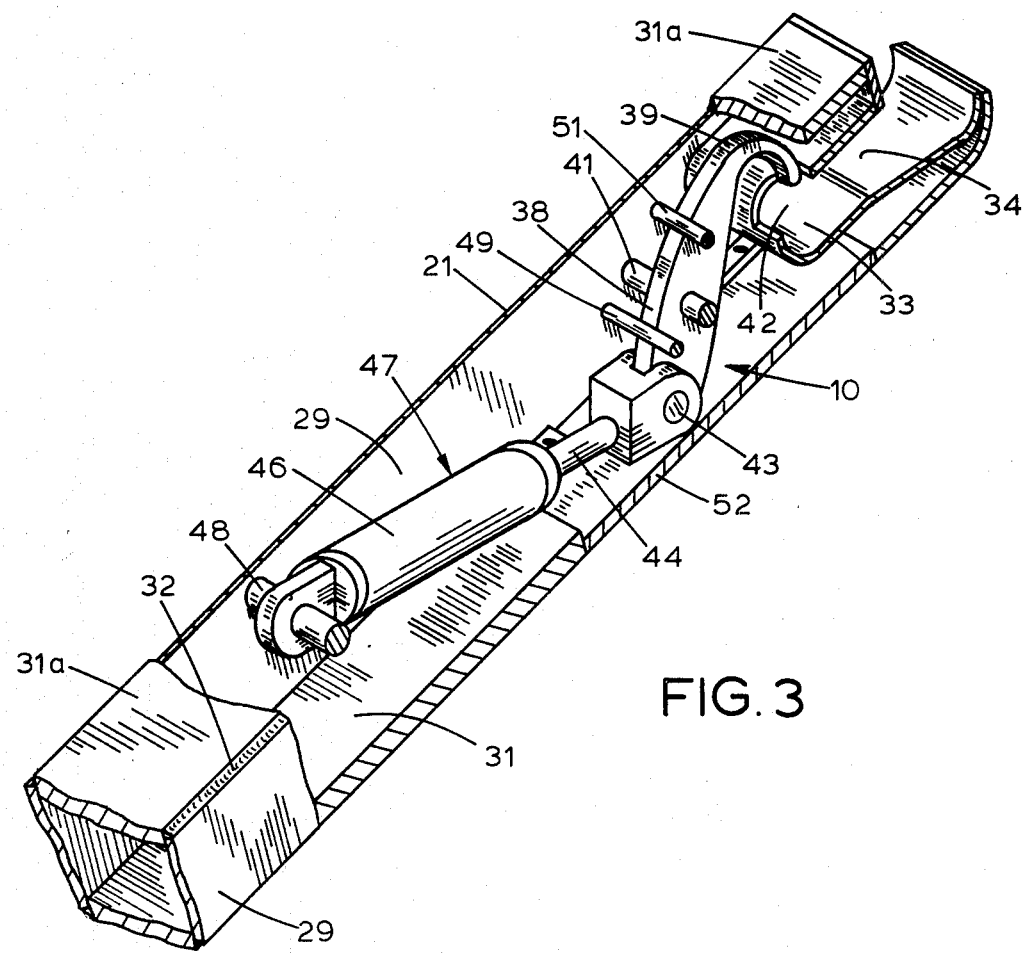
FIG. 3 is a perspective view of the locking mechanism in FIG. 2, shown in assembly relation with the rear lift arm having portions thereof broken away.

As shown in FIGS. 2 and 3, for a rear lift arm 21, the tubular construction of the arm is formed by welding side plates 29 to the opposite sides of a pair of strap bars 31 and 31a as by corner weldments, indicated at 32. The free ends of the side plates 29 are formed with transversely opposite inwardly extended notches 33 within which is positioned a preformed reel support insert or bearing 34 of a generally U-shape in transverse cross section. The base or inner wall 37 of the bearing insert 34 is of an arcuate shape generated with a radius slightly smaller than the radius of the spindle 28 being received within the pocket. It is thus seen (FIG. 2) that opposite side portions of the spindle 28 are movable into a wedged or frictional engagement with the opposite end portions of the arcuate base wall 37 of the bearing insert.

The locking mechanism 10 is enclosed entirely within the lift arm 21 and includes an elongated lever or locking member 38 extended longitudinally of the lift arm and formed at one end with a jaw portion 39 of an arcuate shape corresponding generally to the curvature of the peripheral surface of the spindle 28. The lever 38 is pivoted intermediate its ends at 41 for pivotal movement of the jaw or clamp portion 39 into and out of clamping engagement with the spindle 28 through a slot 42 formed in the bearing insert 34. The opposite end of the lever 38 is pivotally connected at 43 with the piston rod 44 associated with a cylinder 46 of a hydraulic cylinder assembly 47. The closed end of the cylinder 46 is pivoted to the lift arm at 48.

On extension of the piston rod 44, the jaw portion 39 is retracted within the lift arm 21, through the slot 42, to permit movement of the reel spindle 28 into and out of the bearing insert or pocket 34. On retraction of the piston rod 44, the jaw portion 39 is movable through the slot 42 to engage and move the spindle 28 into the pocket base wall 37. As a result of the clamping force, exerted by the jaw portion 39, the spindle is frictionally engaged and held by the jaw portion 39 and by the opposite end portions of the pocket base wall 37 against both rotational and axial movements. The pivotal movement of the locking member 38 to the spindle release and engaging positions therefor is limited by its engagement with abutment or stop members 49 and 51 carried within the arm 21. Thus, as shown in FIG. 2, the clockwise movement of the locking member about the pivot 41 is limited by engagement with the abutment 49 and the counterclockwise movement thereof by engagement with the stop member 51. A cover plate 52 for an opening 53 formed in the strap bar 31 provides access to the locking mechanism 10.

Figure 4:
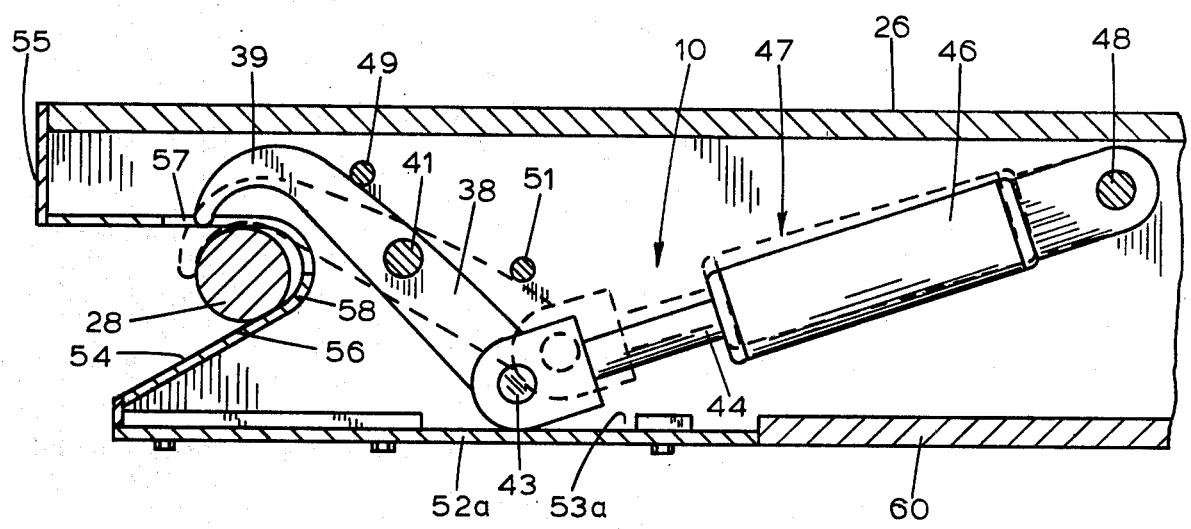
FIG. 4 is an enlarged detail sectional view of the free end portion of a front lift arm illustrated in FIG. 1 showing the reel spindle locking mechanism in side elevation and the locking member in a retracted position.
Figure 5:
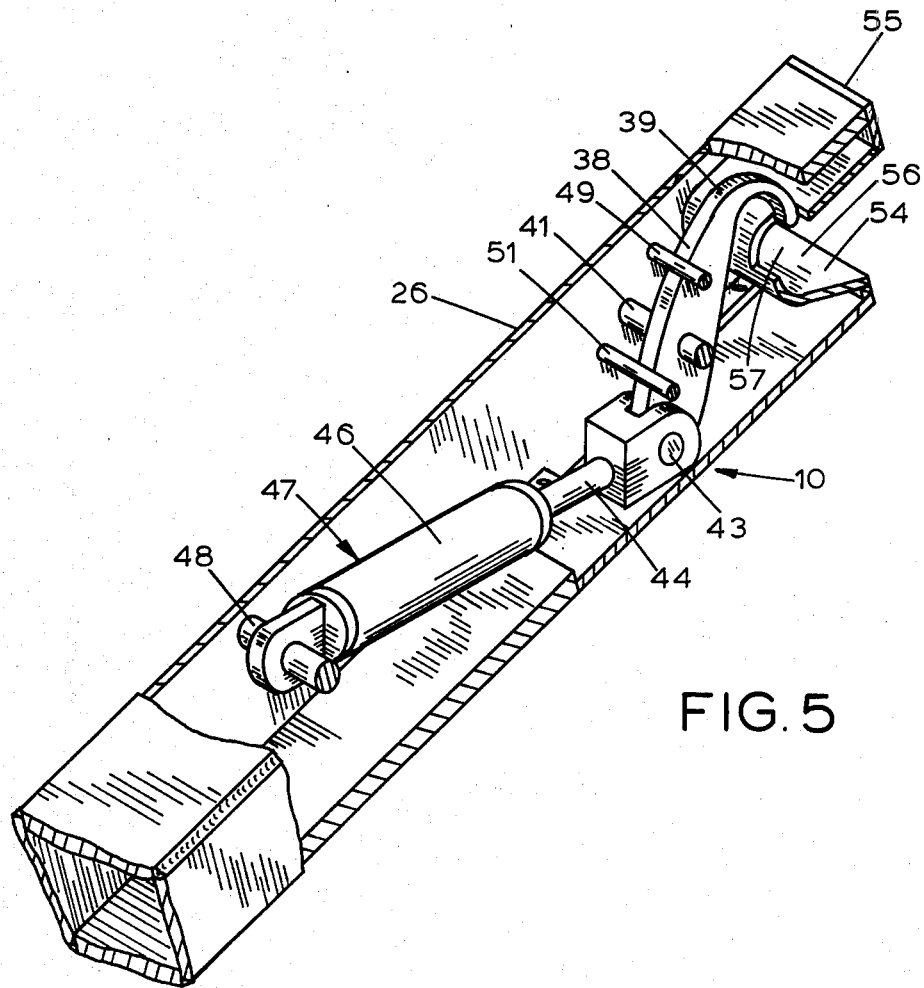
FIG. 5 is a perspective view of the locking mechanism in FIG. 4, shown in assembly relation with a front lift arm having portions thereof broken away.

The locking mechanism 10 is shown in FIGS. 4 and 5 in assembly relation with a front lift arm 26 and is similar in all respects to its operation and assembly as previously described relative to the rear lift arm 21. The free end of a front lift arm 26 is equipped with a bearing or pocket insert 54 fitted within notches 56 in the end plates 55 and formed with a slot 57 for movement therethrough of the jaw 39 of the locking member 38. Similarly to the pocket insert 34, the base wall 58 of the pocket insert 54 is of an arcuate shape and of a slightly reduced size relative to the peripheral contour of a reel spindle 28. The arm strap member 60 has a cover plate 52a for an opening 53a for access to the locking mechanism 10 in a front lift arm 26.

It is thus seen that the free end of each lift arm 21 and 26 is of a bifurcated construction to form a spindle receiving pocket of a generally U-shape in transverse section, open to such free end. The side walls of a pocket are spaced a distance apart to receive a spindle therebetween for movement inwardly of the pocket to a position adjacent to and in engagement with the opposite end portions of the arcuate base wall of a pocket. The spindle is thus clamped within a pocket and rigidly locked against movement by a friction clamping engagement between a locking member and opposite side portions of a pocket.

Figure 6:
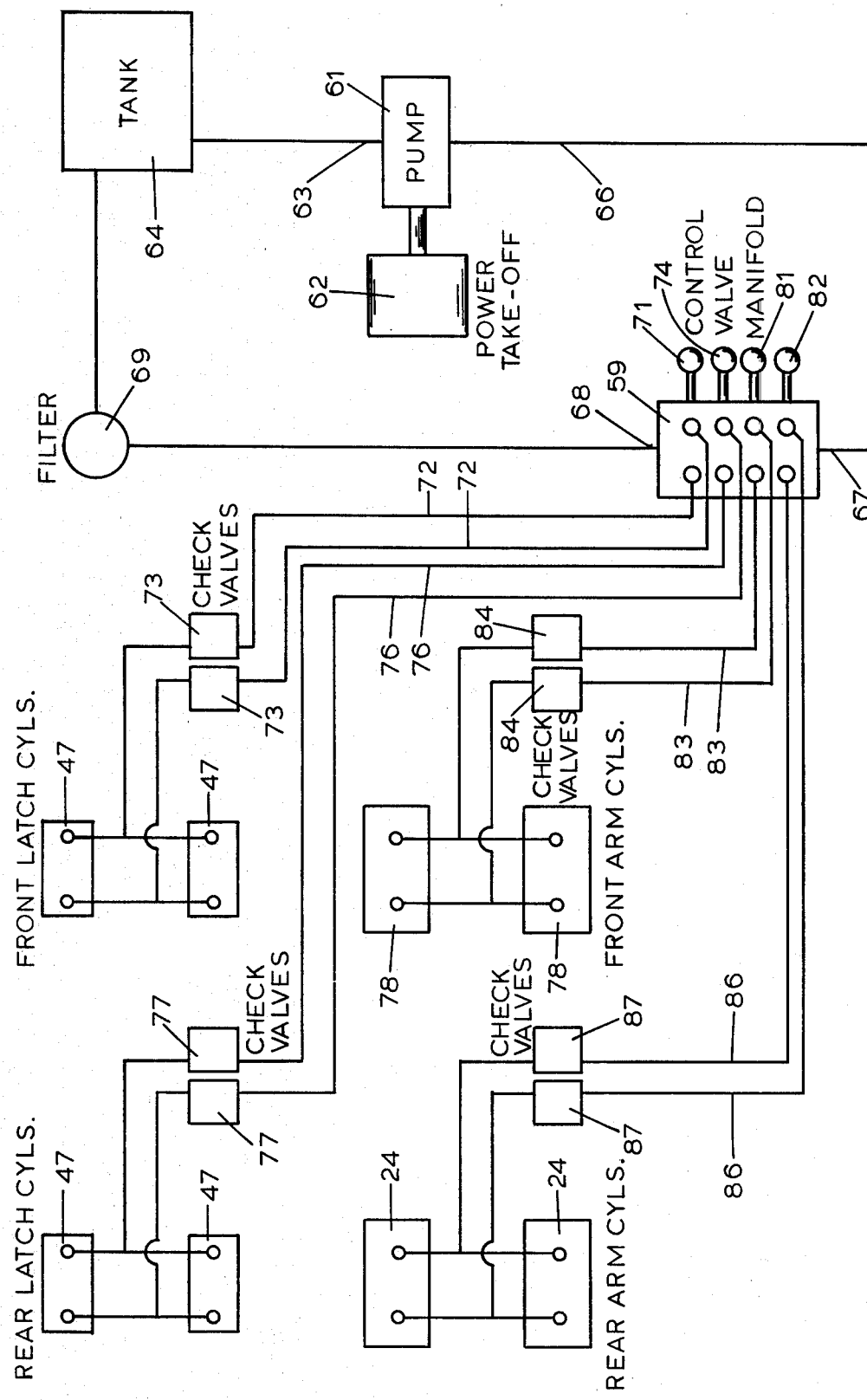
FIG. 6 is a diagrammatic hydraulic control system for the reel locking mechanisms of the front and rear lift arms.

The lift arms 21 and 26 and locking mechanism 10 are remotely actuated from a valve assembly 59 located adjacent the rear end and at one side of the body structure 11 (FIG. 1). The control unit or valve assembly 59 forms part of a hydraulic control system diagrammatically illustrated in FIG. 6. This system includes a pump 61 driven from a power take off 62 operatively associated with the engine (not shown) of the truck 19. The pump has an inlet 63 connected to a fluid reservoir 64 and an outlet 66 connected to the inlet 67 of an intake manifold (not shown) embodied within the valve assembly 59.

An exhaust manifold (not shown) for the valve assembly 59 has an outlet 68 connected to the tank 64 through a filter 69. The double acting cylinder assemblies 47 for the front lift arms 26 are operated in unison by manipulation of a control lever indicated at 71. Each line connection 72 from the valve assembly to the cylinders 47 includes a check valve unit 73 having a pair of reversible check valves (not shown) which function to maintain a full fluid pressure in the cylinders 57 when the pump 61 is inoperative, as takes place when the truck 19 is in transport. Similarly, the cylinders 47 for the rear lift arms 21 ar simultaneously actuated by a control lever 74 with each fluid line 76 being provided with a reversely actuated check valve unit 77.

In a similar manner, the actuating cylinders 78 for the front lift arms 26 and the cylinders 24 for the rear lift arms 21, are operated through control levers 81 and 82, respectively. Each fluid line 83 from the control assembly 59 to the cylinders 78 is provided with a reversible check valve unit 84 and each fluid line 86 for the rear arm cylinders 24 is provided with a reversible check valve unit 87.

The control system provides for the remote control of the lift arms 21 and 26, and associated locking mechanisms 10 along with providing for the arms and locking mechanisms being positively maintained in a moved position.

Although the invention has been described with respect to a preferred embodiment thereof, it is to be understood that it is not to be so limited since changes and modifications can be made therein which are within the full intended scope of this invention as defined by the appended claims.

I claim:

1. A mechanism for locking the spindle of a cable reel in a reel handling apparatus having a pair of lift arms supported on a portable frame for movement to reel loading and operating positions, said mechanism comprising:
   (a) a spindle supporting means on the free end section of each lift arm including a transversely extended spindle receiving pocket having inwardly converging side wall portions such that the distance between said side wall portions adjacent the inner end of the spindle receiving pocket is less than the transverse dimension of said spindle,
   (b) a spindle locking member movably supported on each lift arm including a jaw member movable into and out of a pocket closing position,
   (c) each lift arm of a tubular construction, with said free end section terminating in a bifurcation to form said spindle receiving pocket between the inner adjacent ends of the bifurcated portions thereof, and one of said bifurcated portions having an opening therein for movement therethrough of said jaw member, (d) each locking member housed within the confines of an associated lift arm with the jaw member thereof retractable within said one of said bifurcated portions and out of a pocket closing position therefor, (e) a hydraulic cylinder assembly movably supported within an associated lift arm for actuating an associated locking member, (f) said spindle, when the jaw members are out of a pocket closing position being receivable within said pockets, whereby an actuation of the locking members to move the jaw members into the pocket closing positions therefor, said spindle is engaged and moved within said pockets into frictional wedged engagement with said side wall portions against rotational and axial movements, (g) each locking member comprised of a lever pivotally supported intermediate the ends thereof with said jaw member integrally formed at one end thereof, (h) stop means comprising a pair of abutment members arranged at opposite sides of the lever pivotal support so that the lever is freely movable within a lift arm into and out of a pocket closing position for said jaw member, and (i) means pivotally connecting a hydraulic cylinder assembly with the other end of each locking member.

2. The mechanism according to claim 1, wherein:

(a) a jaw member is of an arcuate shape with the concave surface thereof open to an associated spindle receiving pocket.

* * * * *